Figure 1:
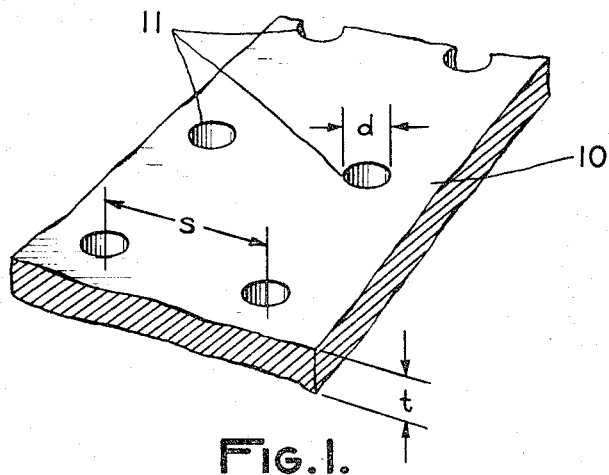

INVENTORS
SMITH H. BROWN
AL J. GURSEY

United States Patent Office 3,277,762
Patented Oct. 11, 1966

3,277,762
PERFORATION APPARATUS
Smith H. Brown, 10328 Lesterford St., Downey, Calif., and Al J. Gursey, 271 S. Mapleton St., Los Angeles, Calif.
Original application Jan. 23, 1961, Ser. No. 84,044, now Patent No. 3,135,586, dated June 2, 1964. Divided and this application Jan. 24, 1964, Ser. No. 349,518
1 Claim. (Cl. 83—635)

This is a division of application Serial No. 84,044, filed January 23, 1961 now Patent No. 3,135,586.

This invention relates to a novel method and apparatus for perforating thin sheet material with a plurality of minute circular holes for ventilating purposes.

In supersonic aircraft there is generally provided an inner fuselage wall which is formed of extremely thin light metal, such as aluminum, suitably perforated to permit ventilating air to pass through the wall. The purpose for this type of ventilation is to maintain a uniform environment within the aircraft. Normally, for example, the nose portion of the craft can become extremely hot. With a perforated inner fuselage lining, this heat is uniformly dissipated over a substantial portion of the aircraft.

The requirements for the inner fuselage material in the above application are quite stringent. For example, it is most desirable that the sheet material itself be from 5 to 30 mils in thickness and that the holes be uniformly circular with diameters which may range from 5 to 15 mils. From 40 to 60 holes per square inch of metal surface insure the most desirable type of ventilation.

To provide openings meeting the above specifications in thin sheet metal has heretofore been an extremely difficult task. Rollers have been provided with generally rectangular or square prongs which will pierce through the metal when the metal is rolled thereunder. A square cross section type hole is undesirable, however, since cracking and failure of the metal can occur at the corners of the square.

To avoid mechanical establishment of strains in the metal, electric arcs have been employed in an attempt to pierce the metal. While minute holes may be made in this manner, there is no assurance of the holes themselves being of uniform circular configurations and thus the disadvantage of possible weakened peripheral points is present.

Conventional punches do not provide a circular cross section, and moreover will often result in burrs.

With all of the foregoing in mind, it is a primary object of this invention to provide a novel method and apparatus for piercing a thin metallic sheet to result in a hole of substantially uniform circular shape wherein the diameter of the hole itself is of the same order of magnitude as the thickness of the metal, both being within the rang from 5 to 30 mils.

More particularly, it is an object to provide a novel method and apparatus for providing a perforated thin sheet of aluminum material adaptable for use as the inner fuslage of supersonic aircraft, wherein the sheet itself has a plurality of uniformly spaced, circular shaped holes passing therethrough of a density from 40 to 60 per square inch.

Other objects and advantages of this invention are to provide a novel method and apparatus for realizing the provision of thin uniformly perforated sheets of metal in an extremely rapid and efficient manner wherein the overall cost in providing such material is reduced over that presently required to form similar material by prior art methods.

Briefly, these and other objects and advantages of this invention are attained by piercing the material with a punching apparatus different from conventional punching apparatus in that a very thin wire of uniform diameter is employed as the punching medium. Preferably, the wire constitutes a short section of steel piano wire and has a diameter corresponding to the diameter of the holes to be pierced in the material. Cooperating with the wire punch is a guide member provided with a circular bore from .1 to .3 mil larger than the diameter of the wire. This guide member cooperates with a die disposed beneath the guide member and also provided with a bore from .1 to .3 mil larger than the diameter of the wire. The material to be punched is sandwiched between the guide member and die in such a manner that the portion of the sheet material to be pierced is disposed beneath the guide bore. With this arrangement, movement of the cylindrical wire back and forth in an axial direction through the bores in the guide and die will result in the desired circular hole.

Figure 2:
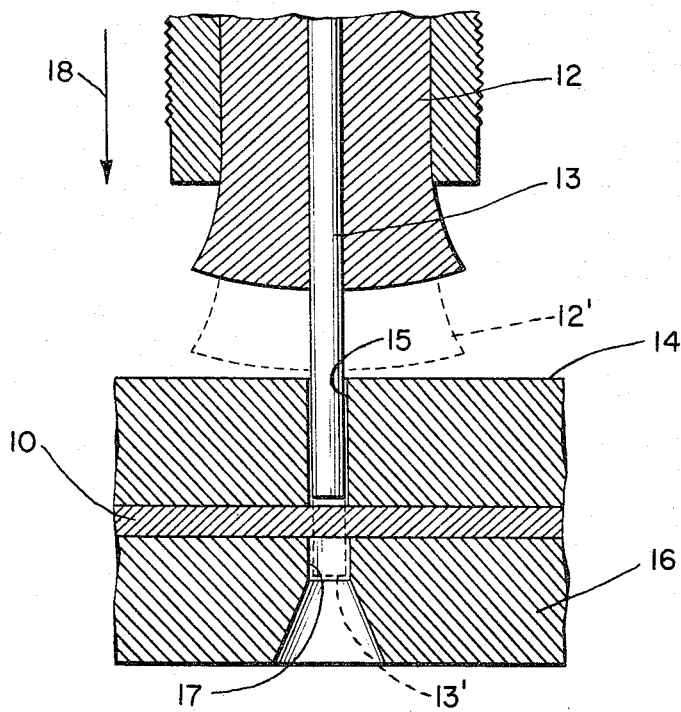

A better understanding of the invention will be had by referring to the accompanying schematic drawing, in which:

FIGURE 1 is a greatly magnified view of a fragmentary portion of a perforated sheet in accordance with the present invention; and, FIGURE 2 is a diagrammatic type illustration of the basic components employed in the method and apparatus of the invention for piercing the material illustrated in FIGURE 1.

Referring first to FIG. 1, there is shown a thin sheet of metal 10 preferably aluminum having a thickness $t$ of from 5 to 30 mils. As shown, the sheet 10 is provided with a plurality of uniformly spaced circular holes 11 of diameter $d$ from 5 to 20 mils passing therethrough. The center-to-center spacing between the holes 11 indicated at $s$ is from 100 to 200 mils.

Referring now to FIGURE 2, there is shown a suitable apparatus for carrying out the method of forming the holes 11 in the sheet of FIGURE 1. As shown, this structure includes a chock 12 which may be similar to a jeweler's chock for firmly holding a thin cylindrical wire 13 of outside diameter equal to the diameter of the hole to be pierced in the sheet. Preferably, the wire 13 constitutes a piece of piano wire.

As shown, there is provided a guide member 14 having a bore 15 of from .1 to .3 mil larger than the diameter of the wire 13 so that the wire may easily move back and forth axially through the bore 15. Also cooperating with the wire 13 is a die 16 disposed beneath the guide member 14 in spaced relationship and provided with a circular bore 17 of from .1 to .3 mil larger than the wire 13. As shown, the lower portion of the bore 17 flares outwardly from the bottom of the die 16. The thin sheet 10 of FIGURE 1 is arranged to be sandwiched within the space between the guide member 14 and die 16.

In operation, the sheet 10 is successively positioned beneath the punch wire 13 and held stationary while the wire 13 is moved axially by the chock 12 in a downward direction as indicated by the arrow 18. This movement causes the wire to pierce through the sheet 10 to a position indicated in dashed lines at 13'. The wire 13 is then retracted and the sheet 10 moved to provide a new area for piercing. The guide 14 prevents any buckling or folding of the piano wire 13 during the punching operation. The resulting holes within the thin material 10 are absolutely circular and uniform in structure. There are substantially no burrs formed. Any minor burrs that do exist are of no consequence and will ordinarily not even be visible.

In the actual manufacture of the thin aluminum perforated sheets, there may be provided a plurality of identical thin wires supported in corresponding punch structures, each similar to that shown in FIGURE 2. If 320 such structures are used to enable 320 holes to be punched at one time in a sheet, approximately 9,000 holes may be punched per minute.

From the foregoing description, it will be evident that the present invention has provided a novel method and apparatus for providing a thin perforated metallic sheet. The holes formed therein are perfectly circular in structure to the end that the chances of cracking or failure as a consequence of non-uniform holes is avoided.

Various minor modifications falling clearly within the spirit and scope of this invention will occur to those skilled in the art. The method and apparatus are therefore not to be thought of as being limited to the exact embodiments set forth merely for illustrative purposes.

What is claimed is:

An apparatus for perforating a sheet of metal of from 5 to 30 mils thickness with circular holes of 5 to 20 mils in diameter comprising, in combination: chock means for securing a thin wire of circular cross section in a given position for axial back and forth movement, said wire having a diameter of from 5 to 20 mils; a guide member having a bore for receiving and guiding movement of said wire; and a die having a bore axially aligned with the bore in said guide member, said die being spaced from said guide member to receive therebetween said sheet of metal with the opposite surfaces of said metal in engagement with said guide member and die, the bores in said guide member and die each having a diameter of from .1 to .3 mil larger than the diameter of said wire, whereby movement of said chock means towards said guide member causes said wire to perforate said sheet to form one of said circular holes.

References Cited by the Examiner

UNITED STATES PATENTS

| | | | |
|---|---|---|---|
| 345,189 | 7/1886 | Stimpson et al. | 83—687 |
| 350,968 | 10/1886 | Blackmer | 83—686 |
| 1,499,309 | 6/1924 | Ramsey | 83—685 X |
| 2,380,485 | 7/1945 | Wales | 83—686 X |
| 2,622,682 | 12/1952 | Kopczynski | 76—101 X |
| 2,785,751 | 3/1957 | Jones | 83—553 X |
| 3,015,424 | 5/1959 | Laframboise | 225—93 |
| 3,021,732 | 2/1962 | Schur. | |

WILLIAM W. DYER, Jr., *Primary Examiner.*

J. M. MEISTER, *Assistant Examiner.*